(12) United States Patent
Schmidt

(10) Patent No.: US 12,249,692 B2
(45) Date of Patent: Mar. 11, 2025

(54) MIXTURE OF POTASSIUM AND LITHIUM SALTS, AND USE THEREOF IN A BATTERY

(71) Applicant: Arkema France, Colombes (FR)

(72) Inventor: Grégory Schmidt, Pierre-Benite (FR)

(73) Assignee: ARKEMA FRANCE, Colombes (FR)

( * ) Notice: Subject to any disclaimer, the term of this patent is extended or adjusted under 35 U.S.C. 154(b) by 1060 days.

(21) Appl. No.: 16/637,929

(22) PCT Filed: Jan. 29, 2019

(86) PCT No.: PCT/FR2019/050196
§ 371 (c)(1),
(2) Date: Feb. 10, 2020

(87) PCT Pub. No.: WO2019/145662
PCT Pub. Date: Aug. 1, 2019

(65) Prior Publication Data
US 2020/0212488 A1    Jul. 2, 2020

(30) Foreign Application Priority Data
Jan. 29, 2018 (FR) ..................... 1850664

(51) Int. Cl.
| | | |
|---|---|---|
| H01M 10/0568 | (2010.01) | |
| H01G 11/62 | (2013.01) | |
| H01M 10/0525 | (2010.01) | |
| H01M 10/0567 | (2010.01) | |
| H01M 10/0569 | (2010.01) | |
| H01M 4/02 | (2006.01) | |

(52) U.S. Cl.
CPC ........ *H01M 10/0568* (2013.01); *H01G 11/62* (2013.01); *H01M 10/0525* (2013.01); *H01M 10/0567* (2013.01); *H01M 10/0569* (2013.01); *H01M 2004/027* (2013.01); *H01M 2004/028* (2013.01); *H01M 2300/0025* (2013.01)

(58) Field of Classification Search
CPC .............. H01G 11/64; H01M 10/0568; H01M 10/0567
See application file for complete search history.

(56) References Cited

U.S. PATENT DOCUMENTS

| | | | |
|---|---|---|---|
| 5,691,083 A | 11/1997 | Bolster | |
| 5,798,191 A | 8/1998 | Choquette et al. | |
| RE37,805 E | 7/2002 | Choquette et al. | |
| 8,257,868 B2 * | 9/2012 | Hagiwara | H01M 10/0568 |
| | | | 429/231.95 |
| 2009/0197168 A1 | 8/2009 | Nishida et al. | |
| 2013/0068991 A1 | 3/2013 | Sato et al. | |
| 2015/0064574 A1 | 3/2015 | He et al. | |
| 2016/0268637 A1 | 9/2016 | Tsubouchi et al. | |
| 2017/0040640 A1 | 2/2017 | Schmidt et al. | |
| 2018/0183104 A1 | 6/2018 | Fujii et al. | |

FOREIGN PATENT DOCUMENTS

| | | | |
|---|---|---|---|
| FR | 2760568 A1 | 9/1998 | |
| FR | 3011683 A1 | 4/2015 | |
| JP | H1027624 A | 1/1998 | |
| JP | H 11-507761 A | 7/1999 | |
| JP | 2009067644 A | 4/2009 | |
| JP | 2014-024786 A | 2/2014 | |
| JP | 3309719 B2 | 7/2020 | |
| KR | 10-2016-0011227 A | 1/2016 | |
| WO | 2007/052742 A1 | 5/2007 | |
| WO | 2011/149095 A1 | 12/2011 | |
| WO | WO-2015049435 A1 * | 4/2015 | ........... C07D 233/90 |
| WO | 2015/132892 A1 | 9/2015 | |

OTHER PUBLICATIONS

K. Kubota, et al., "Novel inorganic ionic liquids possessing low melting temperatures and wide electrochemical windows: Binary mixtures of alkali bis(fluorosulfonyl)amides", Electrochemistry Communications 10, p. 1886-1888 (Year: 2008).*

International Search Report (PCT/ISA/210) issued on Sep. 17, 2019, by the French Patent Office as the International Searching Authority for International Application No. PCT/FR2019/050196.

Office Action (the Second Office Action) issued on Mar. 16, 2022, by the Hungarian Intellectual Property Office in corresponding Hungarian Patent No. P2000261/15, (10 pages).

Wang, M. et al "Effect of LiFSI concentrations to form thickness- and modulus-controlled SEI layers on lithium metal anodes." The Journal of Physical Chemistry, vol. C 122.18, No. 122, 2018, pp. 9825-9834.

Office Action (Notification of the Second Office Action) issued on Feb. 7, 2021 by the China National Intellectual Property Administration in corresponding Chinese Patent Application No. 201980004302. 7, English Translation only. (11 pages).

Office Action (Notice of Grounds for Rejection) issued on Feb. 15, 2021, by the Korean Patent Office in corresponding Korean Patent Application No. 10-2020-7002975, and an English Translation only. (8 pages).

Office Action (Notice of Reasons for Refusal) issued on Nov. 29, 2022, by the Japanese Patent Office in corresponding Japanese Patent Application No. 2020-540704, and an English Translation of the Office Action. (9 pages).

* cited by examiner

*Primary Examiner* — Ryan S Cannon

(74) *Attorney, Agent, or Firm* — Buchanan Ingersoll & Rooney PC

(57) ABSTRACT

A mixture including: 99% to 99.9999% by weight of at least one lithium salt A; and 1 ppm to 10,000 ppm by weight of at least one potassium salt B. Also, a battery including at least one electrochemical cell, the electrochemical cell including a negative electrode, a positive electrode and the mixture.

11 Claims, No Drawings

MIXTURE OF POTASSIUM AND LITHIUM SALTS, AND USE THEREOF IN A BATTERY

FIELD OF THE INVENTION

The present application relates to a mixture of lithium and potassium salts, and also the use thereof in a battery.

TECHNICAL BACKGROUND

Typically, a battery (such as for example a lithium-ion battery or a Li-sulfur battery) comprises at least a negative electrode (anode), a positive electrode (cathode), a separator and an electrolyte. The electrolyte is generally composed of a lithium salt dissolved in a solvent which is generally a mixture of organic carbonates, in order to have a good compromise between the viscosity and the dielectric constant.

In the field of batteries, the passivation layers formed during the first charge/discharge cycles are essential for the life of the battery. As passivation layers, mention may in particular be made of the layer of passivation on aluminum which is the current collector used at the cathode, or else the "Solid Electrolyte Interface" (SEI) which is the inorganic and polymeric layer that is formed at the anode/electrolyte and cathode/electrolyte interface. If the passivation layers are incorrectly formed and/or are not stable, their reformation during the charge/discharge cycles is responsible for a decrease in the battery life: this is because a portion of the current will be used to reform these passivation layers rather than to contribute to the battery life. The formation of dendrites on a lithium metal anode also causes a decrease in battery life.

There is therefore a need to overcome the abovementioned drawbacks, and in particular to improve the life of batteries, including Li-ion type batteries.

DESCRIPTION OF THE INVENTION

Mixture

The present application relates to a mixture comprising (preferably consisting essentially of, and preferentially consisting of):
i) from 99% to 99.9999% by weight of at least one lithium salt A selected from the group consisting of $LiPF_6$; $LiBF_4$; $CH_3COOLi$; $CH_3SO_3Li$; $CF_3SO_3Li$; $CF_3COOLi$; $Li_2B_{12}F_{12}$; $LiBC_4O_8$; of a salt of formula (I) below: $R_1-SO_2-NLi-SO_2-R_2$ (I) wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; of a salt of formula (II) below:

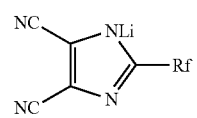

(II)

wherein Rf represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and mixtures thereof;

ii) from 1 ppm to 10 000 ppm by weight of at least one potassium salt B selected from the group consisting of $KPF_6$; $KBF_4$; $CH_3COOK$; $CH_3SO_3K$; $CF_3SO_3K$; $CF_3COOK$; $K_2B_{12}F_{12}$; $KBC_4O_8$; of a salt of formula (III) below: $R_3-SO_2-NK-SO_2-R_4$ (III) wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; of a salt of formula (IV) below:

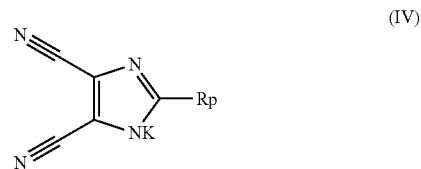

(IV)

wherein Rp represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and mixtures thereof.

In the context of the invention, the term "ppm" or "parts per million" is intended to mean ppm by weight.

In one embodiment, the present invention relates to a mixture comprising (preferably consisting essentially of, and preferentially consisting of):
i) from 99% to 99.9999% by weight of at least one lithium salt A selected from the group consisting of $LiPF_6$; $LiBF_4$; $CH_3COOLi$; $CH_3SO_3Li$; $CF_3SO_3Li$; $CF_3COOLi$; $Li_2B_{12}F_{12}$; $LiBC_4O_8$; of a salt of formula (I) below: $R_1-SO_2-NLi-SO_2-R_2$ (I) wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$;

ii) from 1 ppm to 10 000 ppm by weight of at least one potassium salt B selected from the group consisting of $KPF_6$; $KBF_4$; $CH_3COOK$; $CH_3SO_3K$; $CF_3SO_3K$; $CF_3COOK$; $K_2B_{12}F_{12}$; $KBC_4O_8$; of a salt of formula (II) below: $R_3-SO_2-NK-SO_2-R_4$ (III) wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; of a salt of formula (IV) below:

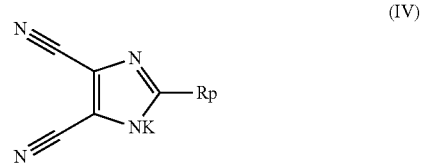

(IV)

wherein Rp represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and mixtures thereof.

According to one embodiment, the mixture comprises:
i) from 99.1% to 99.9999% by weight, preferably from 99.2% to 99.9999% by weight, preferentially from 99.3% to 99.9999% by weight, advantageously from 99.4% by weight to 99.9999% by weight, even more preferentially from 99.5% to 99.9999% by weight, even more advantageously from 99.6% by weight to 99.9999% by weight, preferably from 99.7% to 99.9999% by weight, for example from 99.8% to 99.9999% by weight, and in particular from 99.9% to 99.9999% by weight of at least one lithium salt A mentioned above, and/or ii) from 1 ppm to 9000 ppm, preferably from 1 to 8000 ppm, preferentially from 1 to 7000 ppm, advantageously from 1 to 6000 ppm, even more preferentially from 1 to 5000 ppm, even more advantageously from 1 to 4000 ppm, preferably from 1 to 3000 ppm, for example from 1 to 2000 ppm, and in particular from 1 to 1000 ppm of at least one potassium salt B mentioned above.

According to one embodiment, the mixture comprises from 1 to 1000 ppm of at least one potassium salt B mentioned above, preferably from 1 to 50 ppm, preferentially from 1 to 20 ppm, and even more preferably from 1 to 10 ppm.

According to one embodiment, the mixture comprises at least one lithium salt A as defined above, in a weight content greater than or equal to 99% by weight relative to the total weight of the mixture, preferably greater than or equal to 99.5%, preferentially greater than or equal to 99.9%, advantageously greater than or equal to 99.95%, even more preferentially greater than or equal to 99.99%, even more advantageously greater than or equal to 99.995%, preferably greater than or equal to 99.999%, for example greater than or equal to 99.9995% by weight relative to the total weight of the mixture.

According to one embodiment, the mixture comprises at least one potassium salt B as defined above, in a weight content of less than or equal to 10 000 ppm, preferably less than or equal to 5000 ppm, preferentially less than or equal to 1000 ppm, advantageously less than or equal to 500 ppm, even more preferentially less than or equal to 100 ppm, even more advantageously less than or equal to 50 ppm, preferably less than or equal to 10 ppm, for example less than or equal to 5 ppm by weight relative to the total weight of the mixture.

According to one embodiment, the mixture comprises:
i) from 99% to 99.999% by weight, preferably from 99.5% to 99.999% by weight, preferentially from 99.7% to 99.999% by weight, advantageously from 99.85% by weight to 99.999% by weight, even more preferentially from 99.85% to 99.995% by weight, even more advantageously from 99.9% by weight to 99.99% by weight of at least one lithium salt A mentioned above, and/or
ii) from 10 ppm to 10 000 ppm, preferably from 10 to 5000 ppm, preferentially from 10 to 3000 ppm, advantageously from 10 to 1500 ppm, even more preferentially from 50 to 1500 ppm, even more advantageously from 100 to 1000 ppm of at least one potassium salt B mentioned above.

According to one embodiment, the mixture comprises at least one lithium salt A and at least one potassium salt B, said salts having the same anion. For example, the mixture may comprise $LiPF_6$ and $KPF_6$ (the common anion being $PF_6^-$), or the mixture may comprise a salt of formula (I) wherein $R_1=R_2=F$, and a salt of formula (III) wherein $R_3=R_4=F$.

According to one embodiment, the mixture preferably comprises at least lithium salt A selected from the group consisting of $LiPF_6$, $LiBF_4$, $CH_3COOLi$, $CH_3SO_3Li$, $CF_3SO_3Li$, $CF_3COOLi$, $Li_2B_{12}F_{12}$, $LiBC_4O_8$, and mixtures thereof, the lithium salt A preferably being $LiPF_6$; and at least one potassium salt B selected from the group consisting of $KPF_6$, $KBF_4$, $CH_3COOK$, $CH_3SO_3K$, $CF_3SO_3K$, $CF_3COOK$, $K_2B_{12}F_{12}$, $KBC_4O_8$, and mixtures thereof, the potassium salt B preferably being $KPF_6$.

According to one embodiment, the mixture preferably comprises at least lithium salt A selected from the group consisting of $LiPF_6$, $LiBF_4$, $CH_3COOLi$, $CH_3SO_3Li$, $CF_3SO_3Li$, $CF_3COOLi$, $Li_2B_{12}F_{12}$, $LiBC_4O_8$, and mixtures thereof, the lithium salt A preferably being $LiPF_6$; and at least one potassium salt B having the formula (III) $R_3$—$SO_2$—NK—$SO_2$—$R_4$ wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$, with $R_3$ and $R_4$ preferably representing, independently of one another, F or $CF_3$, and preferentially F.

According to one embodiment, the mixture preferably comprises at least lithium salt A selected from the group consisting of $LiPF_6$, $LiBF_4$, $CH_3COOLi$, $CH_3SO_3Li$, $CF_3SO_3Li$, $CF_3COOLi$, $Li_2B_{12}F_{12}$, $LiBC_4O_8$, and mixtures thereof, the lithium salt A preferably being $LiPF_6$; and at least one potassium salt B having the formula (IV) mentioned above, wherein Rp represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$, Rp preferably representing $CF_3$.

According to one embodiment, the mixture preferably comprises at least lithium salt A having the formula (I) $R_1$—$SO_2$—NK—$SO_2$—$R_2$ wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$, with $R_1$ and $R_2$ preferably representing, independently of one another, F or $CF_3$, and preferentially F; and at least one potassium salt B selected from the group consisting of $KPF_6$, $KBF_4$, $CH_3COOK$, $CH_3SO_3K$, $CF_3SO_3K$, $CF_3COOK$, $K_2B_{12}F_{12}$, $KBC_4O_8$, and mixtures thereof, the potassium salt preferably being $KPF_6$.

According to one embodiment, the mixture preferably comprises at least lithium salt A having the formula (I) $R_1$—$SO_2$—NK—$SO_2$—$R_2$ wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$, with $R_1$ and $R_2$ preferably representing, independently of one another, F or $CF_3$, and preferentially F; and at least one potassium salt B having the formula (III) $R_3$—$SO_2$—NK—$SO_2$—$R_4$ wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$, with $R_3$ and $R_4$ preferably representing, independently of one another, F or $CF_3$, and preferentially F.

According to one embodiment, the mixture preferably comprises at least lithium salt A having the formula (I) $R_1$—$SO_2$—NK—$SO_2$—$R_2$ wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$, with $R_1$ and $R_2$ preferably representing, independently of one another, F or $CF_3$, and preferentially F; and at least one potassium salt B having the formula (IV) mentioned above wherein Rp represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$, Rp preferably representing $CF_3$.

According to one embodiment, the mixture preferably comprises at least lithium salt A having the formula (II) mentioned above wherein Rf represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_5$, $C_8F_{17}$, or $C_9F_{19}$, Rf preferably representing $CF_3$; and at least one potassium salt B selected from the group consisting of $KPF_6$, $KBF_4$, $CH_3COOK$, $CH_3SO_3K$, $CF_3SO_3K$, $CF_3COOK$, $K_2B_{12}F_{12}$, $KBC_4O_8$, and mixtures thereof, the potassium salt B preferably being $KPF_6$.

According to one embodiment, the mixture preferably comprises at least lithium salt A having the formula (II) mentioned above wherein Rf represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $O_4H_2F_7$, $C_4H_4F_5$, $C_5F_{11}$, $C_6F_{13}$, $C_7F_{15}$, $C_8F_{17}$, or $C_9F_{19}$, Rf preferably representing $CF_3$; at least one potassium salt B having the formula (III) $R_3$—$SO_2$—NK—$SO_2$—$R_4$ wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $O_4H_2F_7$, $C_4H_4F_5$, $C_5F_{11}$, $C_6F_{13}$, $C_7F_{15}$, $C_8F_{17}$, or $C_9F_{19}$, With $R_3$ and $R_4$ preferably representing, independently of one another, F or $CF_3$, and preferentially F.

According to one embodiment, the mixture preferably comprises at least lithium salt A having the formula (II) mentioned above wherein Rf represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $O_4H_2F_7$, $C_4H_4F_5$, $C_5F_{11}$, $C_6F_{13}$, $C_7F_{15}$, $C_8F_{17}$, or $C_9F_{19}$, Rf preferably representing $CF_3$; at least one potassium salt B having the formula (IV) mentioned above wherein Rp represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $O_4H_2F_7$, $C_4H_4F_5$, $C_5F_{11}$, $C_6F_{13}$, $C_7F_{15}$, $C_8F_{17}$, or $C_9F_{19}$, Rp preferably representing $CF_3$.

According to one preferred embodiment, the mixture comprises at least one lithium salt A selected from $LiPF_6$, a compound of formula (I) wherein $R_1=R_2=F$ or $R_1=R_2=CF$, and a compound of formula (II) wherein $R_f$ represents $CF_3$; and at least one potassium salt B selected from $KPF_6$, a compound of formula (III) wherein $R_3=R_4=F$ or $R_3=R_4=CF_3$, and a compound of formula (IV) wherein $R_p$ represents $CF_3$.

Preferably, the mixture of the invention is selected from one of the following mixtures:
mixture comprising LiFSI (salt A) and KFSI (salt B of formula (III) with $R_3=R_4=F$);
mixture comprising LiFSI (salt A) and KTDI (salt B of formula (IV) with $R_p=CF_3$);
mixture comprising LiFSI (salt A) and $KPF_6$ (salt B);
mixture comprising LiTDI (salt A of formula (II) with $R_f=CF_3$) and KTDI (salt B of formula (IV) with $R_p=CF_3$);
mixture comprising LiTDI (salt A of formula (II) with $R_f=CF_3$) and $KPF_6$;
mixture comprising LiTDI (salt A of formula (II) with $R_f=CF_3$) and KFSI (salt B of formula (III) with $R_3=R_4=F$);
mixture comprising $LiPF_6$ (salt A) and KFSI (salt B of formula (III) with $R_3=R_4=F$);
mixture comprising $LiPF_6$ (salt A) and $KPF_6$ (salt B);
mixture comprising $LiPF_6$ (salt A) and KTDI (salt B of formula (IV) with $R_p=CF_3$);
mixture comprising LiFSI and $LiPF_6$ (salts A) and KFSI (salt B of formula (III) with $R_3=R_4=F$);
mixture comprising LiFSI and $LiPF_6$ (salts A) and KTDI (salt B of formula (IV) with $R,=CF_3$);
mixture comprising LiFSI and $LiPF_6$ (salts A) and $KPF_6$ (salt B);
mixture comprising LiFSI and LiTDI (formula (II) with $R_f=CF_3$) (salts A) and KTDI (salt B of formula (IV) with $R_p=CF_3$);
mixture comprising LiFSI and LiTDI (formula (II) with $R_f=CF_3$) (salts A) and KFSI (salt B of formula (III) with $R_3=R_4=F$);
mixture comprising LiFSI and LiTDI (formula (II) with $R_f=CF_3$) (salts A) and $KPF_6$ (salt B);
mixture comprising $LiPF_6$ and LiTDI (formula (II) with $R_f=CF_3$) (salts A) and KTDI (salt B of formula (IV) with $R_p=CF_3$);
mixture comprising $LiPF_6$ and LiTDI (formula (II) with $R_f=CF_3$) (salts A) and KFSI (salt B of formula (III) with $R_3=R_4=F$); and
mixture comprising $LiPF_6$ and LiTDI (formula (II) with $R_f=CF_3$) (salts A) and $KPF_6$ (salt B).

Even more preferably, the mixture of the invention is selected from one of the following mixtures:
mixture comprising LiFSI (salt A) and KFSI (salt B of formula (III) with $R_3=R_4=F$);
mixture comprising $LiPF_6$ (salt A) and $KPF_6$ (salt B);
mixture comprising LiFSI (salt A) and KTDI (salt B of formula (IV) with $R_p=CF_3$);
mixture comprising LiFSI and $LiPF_6$ (salts A) and KFSI (salt B of formula (III) with $R_3=R_4=F$);
and even more preferentially selected from one of the following mixtures:
mixture comprising LiFSI (salt A) and KFSI (salt B of formula (III) with $R_3=R_4=F$);
mixture comprising $LiPF_6$ (salt A) and $KPF_6$ (salt B).

According to one preferred embodiment, the mixture of the invention is a mixture comprising LiFSI (salt A) and KFSI (salt B of formula (III) with $R_3=R_4=F$), the amount in KFSI ranging from 1 to 1000 ppm, preferably from 1 to 50 ppm, preferentially from 1 to 20 ppm, and even more preferably from 1 to 10 ppm relative to the total weight of the mixture.

The mixture according to the invention can be prepared by mixing the various constituents either simultaneously or consecutively.

The present application also relates to the use of a mixture as defined above, in a battery, for example a Li-ion battery, in particular at a temperature greater than or equal to 25° C., preferably of between 25° C. and 80° C., and/or in particular at a voltage of between 4 and 5, preferably at 4.2, 4.35, 4.4, 4.5 or 4.7 volts. For example, the use occurs in mobile devices, for example mobile phones, cameras, tablets or laptops, in electric vehicles, or in the storage of renewable energy.

Electrolyte Composition

The present invention also relates to an electrolyte composition, in particular for a battery such as for example a Li-ion battery, comprising the mixture of lithium salts as defined above, at least one solvent and optionally at least one electrolytic additive.

Preferably, the electrolyte composition comprises no alkali metal or alkaline-earth metal salt other than those of the abovementioned mixture.

Preferably, the electrolyte composition does not comprise any lithium salt or potassium salt other than those mentioned above for the mixture.

Preferably, the potassium and lithium salts mentioned above for the mixture represent 100% of all the salts present in the composition.

In the context of the invention, "electrolyte composition", "electrolyte" and "electrolytic composition" are used interchangeably.

According to a preferred embodiment, the electrolyte composition comprises from 1% to 99% by weight of the aforementioned mixture, preferably from 5% to 99%, and advantageously from 20% to 95%, relative to the total weight of the composition.

According to a preferred embodiment, the electrolyte composition comprises from 1% to 99% by weight of solvent, preferably from 5% to 99%, and advantageously from 20% to 95%, relative to the total weight of the composition.

According to one embodiment, the molar concentration of the abovementioned mixture, in the electrolyte composition, is less than or equal to 7 mol/l, advantageously less than or equal to 4 mol/l, preferably less than or equal to 2 mol/l, preferentially less than or equal to 1.5 mol/I, and in particular less than or equal to 1.1 mol/l, for example less than or equal to 1 mol/l.

According to one embodiment, the electrolyte composition can comprise a solvent or a mixture of solvents, such as, for example, two, three or four different solvents.

The solvent of the electrolyte composition can be a liquid solvent, optionally gelled by a polymer, or a polar polymer solvent optionally plasticized by a liquid.

According to one embodiment, the solvent is an organic solvent, preferably an aprotic organic solvent. Preferably, the solvent is a polar organic solvent.

According to one embodiment, the solvent is selected from the group consisting of ethers, carbonates, esters, ketones, partially hydrogenated hydrocarbons, nitriles, amides, alcohols, sulfoxides, sulfolane, nitromethane, 1,3-dimethyl-2-imidazolidinone, 1,3-dimethyl-3,4,5,6-tetrahydro-2(1H)-pyrimidinone, 3-methyl-2-oxazolidinone and mixtures thereof.

Mention may be made, among the ethers, of linear or cyclic ethers, such as, for example, dimethoxyethane (DME), methyl ethers of oligoethylene glycols of 2 to 5 oxyethylene units, dioxolane, dioxane, dibutyl ether, tetrahydrofuran and mixtures thereof.

Mention may be made, among the esters, of phosphoric acid esters or sulfite esters. Mention may be made, for example, of methyl formate, methyl acetate, methyl propionate, ethyl acetate, butyl acetate, γ-butyrolactone or mixtures thereof.

Mention may in particular be made, among the ketones, of cyclohexanone.

Mention may be made, among the alcohols, for example, of ethyl alcohol or isopropyl alcohol.

Mention may be made, among the nitriles, for example, of acetonitrile, pyruvonitrile, propionitrile, methoxypropionitrile, dimethylaminopropionitrile, butyronitrile, isobutyronitrile, valeronitrile, pivalonitrile, isovaleronitrile, glutaronitrile, methoxyglutaronitrile, 2-methylglutaronitrile, 3-methylglutaronitrile, adiponitrile, malononitrile and mixtures thereof.

Among the carbonates, mention may for example be made of cyclic carbonates such as for example ethylene carbonate (EC) (CAS: 96-49-1), propylene carbonate (PC) (CAS: 108-32-7), butylene carbonate (BC) (CAS: 4437-85-8), dimethyl carbonate (DMC) (CAS: 616-38-6), diethyl carbonate (DEC) (CAS: 105-58-8), ethyl methyl carbonate (EMC) (CAS: 623-53-0), diphenyl carbonate (CAS 102-09-0), methyl phenyl carbonate (CAS: 13509-27-8), dipropyl carbonate (DPC) (CAS: 623-96-1), methyl propyl carbonate (MPC) (CAS: 1333-41-1), ethyl propyl carbonate (EPC), vinylene carbonate (VC) (CAS: 872-36-6), fluoroethylene carbonate (FEC) (CAS: 114435-02-8), trifluoropropylene carbonate (CAS: 167951-80-6) or mixtures thereof.

The solvent which is particularly preferred is selected from the carbonates and mixtures thereof.

According to one embodiment, the electrolyte composition comprises one of the following mixtures:
  ethylene carbonate (EC)/propylene carbonate (PC)/dimethyl carbonate (DMC) in a 1/1/1 ratio by weight;
  ethylene carbonate (EC)/propylene carbonate (PC)/diethyl carbonate (DEC) in a 1/1/1 ratio by weight;
  ethylene carbonate (EC)/propylene carbonate (PC)/ethyl methyl carbonate (EMC) in a 1/1/1 ratio by weight;
  ethylene carbonate (EC)/dimethyl carbonate (DMC) in a 1/1 ratio by weight;
  ethylene carbonate (EC)/diethyl carbonate (DEC) in a 1/1 weight ratio;
  ethylene carbonate (EC)/ethyl methyl carbonate (EMC) in a 1/1 ratio by weight;
  ethylene carbonate (EC)/dimethyl carbonate (DMC) in a ratio by weight in a 3/7 ratio by volume;
  ethylene carbonate (EC)/diethyl carbonate (DEC) in a 3/7 ratio by volume;
  ethylene carbonate (EC)/ethyl methyl carbonate (EMC) in a 3/7 ratio by volume;
  dioxolane (DOL)/dimethoxyethane (DME) in a 2/1 ratio by volume;
  dioxolane (DOL)/dimethoxyethane (DME) in a 1/1 ratio by volume.

According to one embodiment, the electrolyte composition comprises at least one electrolytic additive.

Preferably, the electrolytic additive is selected from the group consisting of fluoroethylene carbonate (FEC), vinylene carbonate, 4-vinyl-1,3-dioxolan-2-one, pyridazine, vinylpyridazine, quinoline, vinylquinoline, butadiene, sebaconitrile, $LiB(C_2O_4)_2$, lithium nitrate, alkyl disulfides, fluorotoluene, 1,4-dimethoxytetrafluorotoluene, t-butylphenol, di-t-butylphenol, tris(pentafluorophenyl)borane, oximes, aliphatic epoxides, halogenated biphenyls, methacrylic acids, allyl ethyl carbonate, vinyl acetate, divinyl adipate, acrylonitrile, 2-vinylpyridine, maleic anhydride, methyl cinnamate, phosphonates, silane compounds containing a vinyl, 2-cyanofuran and mixtures thereof, the electrolytic additive preferably being fluoroethylene carbonate (FEC).

For example, the content of electrolytic additive in the electrolyte composition is between 0.01% and 10%, preferably between 0.1% and 4%, by weight, relative to the total weight of the electrolyte composition. In particular, the content of electrolytic additive in the electrolyte composition is less than or equal to 2% by weight, relative to the total weight of the composition.

The content of electrolytic additive in the electrolyte composition may for example be between 0.01% and 10%, preferably between 0.1% and 4%, by weight, relative to the total weight of the solvent of said composition.

The electrolyte composition may be prepared by any means known to those skilled in the art, for example by dissolving, preferably with stirring, the salts in appropriate proportions of solvent(s) and/or additive(s).

The present application also relates to the use of an electrolyte composition as defined above, in a battery, for example a Li-ion battery, in particular at a temperature greater than or equal to 25° C., preferably of between 25° C. and 80° C., and/or in particular at a voltage of between 4 and 5, preferably at 4.2, 4.35, 4.4, 4.5 or 4.7 volts. For example, the use occurs in mobile devices, for example mobile phones, cameras, tablets or laptops, in electric vehicles, or in the storage of renewable energy.

Electrochemical Cell

The present application also relates to an electrochemical cell comprising a negative electrode, a positive electrode, and a mixture of lithium salts as described above.

The present application also relates to an electrochemical cell comprising a negative electrode, a positive electrode and an electrolyte composition as defined here above, interposed between the negative electrode and the positive electrode. The electrochemical cell can also comprise a separator, in which the electrolyte composition as defined above is impregnated.

The present invention also relates to a battery comprising at least one electrochemical cell as described above. When the battery comprises several electrochemical cells according to the invention, said cells can be assembled in series and/or in parallel.

In the context of the invention, negative electrode is intended to mean the electrode which acts as anode when the battery produces current (that is to say, when it is in the process of discharging) and which acts as cathode when the battery is in the process of charging.

The negative electrode typically comprises an electrochemically active material, optionally an electrochemically active material, and optionally a binder.

In the context of the invention, "electrochemically active material" is intended to mean a material capable of reversibly inserting ions.

In the context of the invention, "electrochemically active" is intended to mean a material capable of conducting electrons.

According to one embodiment, the negative electrode of the electrochemical cell comprises, as electrochemically active material, graphite, lithium, a lithium alloy, a lithium titanate of $Li_4Ti_5O_{12}$ or $TiO_2$ type, silicon or a lithium/silicon alloy, a tin oxide, a lithium intermetallic compound or a mixture thereof.

The negative electrode can comprise lithium; the latter can then consist of a film of metal lithium or of an alloy comprising lithium. An example of negative electrode can comprise an active lithium film prepared by rolling a strip of lithium between rollers.

In the context of the invention, positive electrode is intended to mean the electrode which acts as cathode when the battery produces current (that is to say, when it is in the process of discharging) and which acts as anode when the battery is in the process of charging.

The positive electrode typically comprises an electrochemically active material, optionally an electrochemically active material, and optionally a binder.

In another embodiment, the positive electrode of the electrochemical cell comprises an electrochemically active material selected from manganese dioxide ($MnO_2$), iron oxide, copper oxide, nickel oxide, lithium/manganese composite oxides (for example $Li_xMn_2O_4$ or $Li_xMnO_2$), lithium/nickel composition oxides (for example $Li_xNiO_2$), lithium/cobalt composition oxides (for example $Li_xCoO_2$), lithium/nickel/cobalt composite oxides (for example $LiNi_{1-y}Co_yO_2$), lithium/nickel/cobalt/manganese composite oxides (for example $LiNi_xMn_yCo_zO_2$ with x+y+z=1), lithium-enriched lithium/nickel/cobalt/manganese composite oxides (for example $Li_{1+x}(Ni_xMn_yCo_z)_{1-x}O_2$), lithium/transition metal composite oxides, lithium/manganese/nickel composite oxides of spinel structure (for example $Li_xMn_{2-y}Ni_yO_4$), lithium/phosphorus oxides of olivine structure (for example $Li_xFePO_4$, $Li_xFe_{1-y}Mn_yPO_4$ or $Li_xCoPO_4$), iron sulfate, vanadium oxides and mixtures thereof.

Preferably, the positive electrode comprises an electrochemically active material selected from $LiCoO_2$, $LiFePO_4$ (LFP), $LiMn_xCo_yNi_zO_2$ (NMC, with x+y+z=1), $LiFePO_4F$, $LiFeSO_4F$, $LiNi_{x1}Co_{y1}Al_{z1}O_2$ (NCA, with $x_1+y_1+z_1=1$) and mixtures thereof.

The material of the positive electrode can also comprise, besides the electrochemically active material, an electrochemically active material, such as a carbon source, including, for example, carbon black, Ketjen® carbon, Shawinigan carbon, graphite, graphene, carbon nanotubes, carbon fibers (such as vapor-grown carbon fibers (VGCF)), non-powdery carbon obtained by carbonization of an organic precursor, or a combination of two or more of these. Other additives can also be present in the material of the positive electrode, such as lithium salts or inorganic particles of ceramic or glass type, or also other compatible active materials (for example sulfur).

The material of the positive electrode can also comprise a binder. Nonlimiting examples of binders comprise linear, branched and/or crosslinked polyether polymer binders (for example polymers based on poly(ethylene oxide) (PEO), or poly(propylene oxide) (PPO) or on a mixture of the two (or an EO/PO copolymer), and optionally comprising crosslinkable units), water-soluble binders (such as SBR (styrene/butadiene rubber), NBR (acrylonitrile/butadiene rubber), HNBR (hydrogenated NBR), CHR (epichlorohydrin rubber), ACM (acrylate rubber)), or binders of fluoropolymer type (such as PVDF (polyvinylidene fluoride), PTFE (polytetrafluoroethylene)), and their combinations. Some binders, such as those which are soluble in water, can also comprise an additive, such as CMC (carboxymethylcellulose).

The mixture of salts according to the invention advantageously makes it possible to improve the life of the battery.

The present invention also relates to the use of at least one potassium salt B as defined above, in a mixture comprising at least 99% by weight of at least one lithium salt A as defined above (preferably from 99% to 99.9999% by weight of at least one lithium salt A), for improving the life of a battery, particularly a Li-ion battery.

In the context of the invention, the term "of between x and y" or "between x and y" is intended to mean an interval in which the limits x and y are included. For example, the range "of between 1% and 98%" or "ranging from 1% to 98%" includes in particular the values 1% and 98%.

All the embodiments described above can be combined with one another.

The following examples illustrate the invention without, however, limiting it.

Experimental Section

Example 1: Salt A=$LiPF_6$

Cyclic voltammetry tests were carried out. For that, CR2032 button cells were manufactured with a 20 mm diameter aluminum foil as working electrode, an 8 mm diameter lithium metal pellet as reference electrode and an 18 mm diameter fiberglass separator impregnated with 12 drops (0.6 ml) of a 1 mol/l solution of lithium salt $LiPF_6$ to which has been added a potassium salt $KPF_6$, in a mixture of solvent composed of ethylene carbonate and ethyl methyl carbonate (CAS=623-53-0) in a ratio of 3/7 by volume. A voltage sweep is then carried out at the terminals of the button cell and the generated current is measured and recorded. The voltage sweep is carried out at 4V and 4.2V. The following table shows the oxidation currents at various voltages after two back and forward voltage sweeps for various amounts of potassium salt added. The two prior sweeps allow the formation of the passivation layers such as the SEI and the passivation of aluminum.

| voltage (V) | 4 | 4.2 |
| --- | --- | --- |
| LiPF$_6$ alone | 28.5 μA | 23.4 μA |
| LiPF$_6$ + 10 000 ppm KPF$_6$ | 5.7 μA | 6.15 μA |
| LiPF$_6$ + 1000 ppm KPF$_6$ | 7.5 μA | 8.3 μA |
| LiPF$_6$ + 100 ppm KPF$_6$ | 11 μA | 12 μA |
| LiPF$_6$ + 10 ppm KPF$_6$ | 17.8 μA | 16.4 μA |

The oxidation current observed can reflect many phenomena: corrosion of the aluminum, degradation of the electrolyte and the formation of lithium dendrites. All these phenomena are responsible for the degradation of the life of Li-ion batteries. The lower the current, the more the life of the battery is improved. At 4 V and at 4.2 V, the results show that the addition of KPF$_6$ to LiPF$_6$ advantageously makes it possible to reduce this oxidation current compared with LiPF$_6$ alone, and thus to improve the life of Li-ion batteries.

Example 2: Salt A=LiFSI

Cycling tests were carried out. For that, CR2032 button cells were manufactured with an NMC111 cathode, an 8 mm diameter lithium metal pellet as anode and an 18 mm diameter fiberglass separator impregnated with 12 drops (0.6 ml) of a 1 mol/solution of lithium salt LiFSI to which has been added a potassium salt KFSI, in a mixture of solvent composed of ethylene carbonate and ethyl methyl carbonate (CAS=623-53-0) in a ratio of 3/7 by volume. This battery then undergoes two formation cycles at a rate of C/20 to form the various passivation layers. After these two formation cycles, the battery is charged at C/5 and discharged C/2 at 25° C. until the capacity reaches 80% of the initial capacity determined after the two formation cycles. The following table shows the number of cycles reached at 80% capacity for various contents of KFSI (mixed with LiFSI):

| KFSI (ppm) | No. cycle at 80% DOD |
| --- | --- |
| 0 | 165 |
| 10 | 177 |

The invention claimed is:
1. A mixture comprising:
from 99% to 99.9999% by weight of at least one lithium salt A selected from the group consisting of LiPF$_6$; LiBF$_4$; CH$_3$COOLi; CH$_3$SO$_3$Li; CF$_3$SO$_3$Li; CF$_3$COOLi; Li$_2$B$_{12}$F$_{12}$; LiBC$_4$O$_8$; a salt of formula (I) below: R$_1$—SO$_2$—NLi—SO$_2$—R$_2$ (I) wherein R$_1$ and R$_2$ represent, independently of one another, F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_6$F$_{13}$, C$_7$F$_{15}$, C$_8$F$_{17}$, or C$_9$F$_{19}$; a salt of formula (II) below:

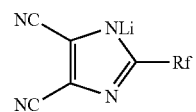

(II)

wherein Rf represents F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_6$F$_{13}$, C$_7$F$_{15}$, C$_8$F$_{17}$, or C$_9$F$_{19}$; and mixtures thereof;
from 1 ppm to 10 000 ppm by weight of at least one potassium salt B selected from the group consisting of KPF$_6$; KBF$_4$; CH$_3$SO$_3$K; CF$_3$SO$_3$K; K$_2$B$_{12}$F$_{12}$; KBC$_4$O$_8$; a salt of formula (III) below: R$_3$—SO$_2$—NK—SO$_2$—R$_4$ (III) wherein R$_3$ and R$_4$ represent, independently of one another, F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_6$F$_{13}$, C$_7$F$_{15}$, C$_8$F$_{17}$, or C$_9$F$_{19}$; a salt of formula (IV) below:

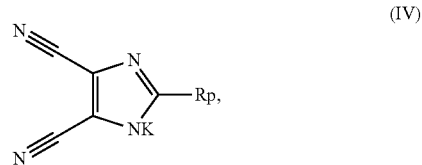

(IV)

wherein Rp represents F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_6$F$_{13}$, C$_7$F$_{15}$, C$_8$F$_{17}$, or CF$_{19}$; and mixtures thereof.

2. The mixture as claimed in claim 1, comprising:
from 99.1% to 99.9999% by weight of at least one lithium salt A, and
from 1 ppm to 9000 ppm of at least one potassium salt B.

3. The mixture as claimed in claim 1, comprising:
from 99% to 99.999% by weight of at least one lithium salt A, and
from 10 ppm to 10,000 ppm of at least one potassium salt B.

4. The mixture as claimed in claim 1, wherein the mixture comprises from 1 to 1000 ppm of at least one potassium salt B.

5. The mixture as claimed in claim 1, wherein the lithium salt A and the potassium salt B have the same anion.

6. The mixture as claimed in claim 1, wherein:
the lithium salt A is selected from the group consisting of LiPF$_6$, LiBF$_4$, CH$_3$COOLi, CH$_3$SO$_3$Li, CF$_3$SO$_3$Li, CF$_3$COOLi, Li$_2$B$_{12}$F$_{12}$, LiBC$_4$O$_8$, and mixtures thereof; and the potassium salt B is selected from the group consisting of KPF$_6$, KBF$_4$, CH$_3$SO$_3$K, CF$_3$SO$_3$K, K$_2$B$_{12}$F$_{12}$, KBC$_4$O$_8$, and mixtures thereof;
or
the lithium salt A is selected from the group consisting of LiPF$_6$, LiBF$_4$, CH$_3$COOLi, CH$_3$SO$_3$Li, CF$_3$SO$_3$Li, CF$_3$COOLi, Li$_2$B$_{12}$F$_{12}$, LiBC$_4$O$_8$, and mixtures thereof; and the potassium salt B has the formula (III) R$_3$—SO$_2$—NK—SO$_2$—R$_4$ wherein R$_3$ and R$_4$ represent, independently of one another, F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_6$F$_{13}$, C$_7$F$_{15}$, C$_8$F$_{17}$, or C$_9$F$_{19}$;
or
the lithium salt A is selected from the group consisting of LiPF$_6$, LiBF$_4$, CH$_3$COOLi, CH$_3$SO$_3$Li, CF$_3$SO$_3$Li, CF$_3$COOLi, Li$_2$B$_{12}$F$_{12}$, LiBC$_4$O$_8$, and mixtures thereof; and the potassium salt B has the formula (IV), wherein Rp represents F, CF$_3$, CHF$_2$, CH$_2$F, C$_2$HF$_4$, C$_2$H$_2$F$_3$, C$_2$H$_3$F$_2$, C$_2$F$_5$, C$_3$F$_7$, C$_3$H$_2$F$_5$, C$_3$H$_4$F$_3$, C$_4$F$_9$, C$_4$H$_2$F$_7$, C$_4$H$_4$F$_5$, C$_5$F$_{11}$, C$_6$F$_{13}$, C$_7$F$_{15}$, C$_8$F$_{17}$, or C$_9$F$_{19}$;

or the lithium salt A has formula (I) $R_1$—$SO_2$—NK—$SO_2$—$R_2$ wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and the potassium salt B is selected from the group consisting of $KPF_6$, $KBF_4$, $CH_3SO_3K$, $CF_3SO_3K$, $K_2B_{12}F_{12}$, $KBC_4O_8$, and mixtures thereof;

or the lithium salt A has the formula (I) $R_1$—$SO_2$—NK—$SO_2$—$R_2$ wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and the potassium salt B has the formula (III) $R_3$—$SO_2$—NK—$SO_2$—$R_4$ wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$;

or the lithium salt the A has the formula (I) $R_1$—$SO_2$—NK—$SO_2$—$R_2$ wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and the potassium salt B has the formula (IV) as defined in claim 1, wherein Rp represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$;

or the lithium salt A has the formula (II) mentioned above wherein Rf represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and the potassium salt B is selected from the group consisting of $KPF_6$, $KBF_4$, $CH_3SO_3K$, $CF_3SO_3K$, $K_2B_{12}F_{12}$, $KBC_4O_8$, and mixtures thereof;

or the lithium salt A has the formula (II) as defined in claim 1, wherein Rf represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and the potassium salt B has the formula (III) $R_3$—$SO_2$—NK—$SO_2$—$R_4$ wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$;

or the lithium salt A has the formula (II) as defined in claim 1, wherein Rf represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and the potassium salt B has the formula (IV) as defined in claim 1, wherein Rp represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$.

7. The mixture as claimed in claim 1, wherein the mixture comprises at least one lithium salt A selected from $LiPF_6$, a compound of formula (I) wherein $R_1=R_2=F$ or $R_1=R_2=CF_3$, and a compound of formula (II) wherein Rf represents $CF_3$; and at least one potassium salt B selected from $KPF_6$, a compound of formula (III) wherein $R_3=R_4=F$ or $R_3=R_4=CF_3$, and a compound of formula (IV) wherein Rp represents $CF_3$.

8. The mixture as claimed in claim 1, wherein the mixture is selected from one of the following mixtures:

mixture comprising lithium bis(fluorosulfonyl)imide (LiFSI) (salt A) and KFSI (salt B of formula (III) with $R_3=R_4=F$);

mixture comprising LiFSI (salt A) and KTDI (salt B of formula (IV) with $R_p=CF_3$);

mixture comprising LiFSI (salt A) and $KPF_6$ (salt B);

mixture comprising LiTDI (salt A of formula (II) with $R_f=CF_3$) and KTDI (salt B of formula (IV) with $R_p=CF_3$);

mixture comprising LiTDI (salt A of formula (II) with $R_f=CF_3$) and $KPF_6$;

mixture comprising LiTDI (salt A of formula (II) with $R_f=CF_3$) and KFSI (salt B of formula (III) with $R_3=R_4=F$);

mixture comprising $LiPF_6$ (salt A) and KFSI (salt B of formula (III) with $R_3=R_4=F$);

mixture comprising $LiPF_6$ (salt A) and $KPF_6$ (salt B);

mixture comprising $LiPF_6$ (salt A) and KTDI (salt B of formula (IV) with $R_p=CF_3$);

mixture comprising LiFSI and $LiPF_6$ (salts A) and KFSI (salt B of formula (III) with $R_3=R_4=F$);

mixture comprising LiFSI and $LiPF_6$ (salts A) and KTDI (salt B of formula (IV) with $R_p=CF_3$);

mixture comprising LiFSI and $LiPF_6$ (salts A) and $KPF_6$ (salt B);

mixture comprising LiFSI and LiTDI (formula (II) with $R_f=CF_3$) (salts A) and KTDI (salt B of formula (IV) with $R_p=CF_3$);

mixture comprising LiFSI and LiTDI (formula (II) with $R_f=CF_3$) (salts A) and KFSI (salt B of formula (III) with $R_3=R_4=F$);

mixture comprising LiFSI and LiTDI (formula (II) with $R_f=CF_3$) (salts A) and $KPF_6$ (salt B);

mixture comprising $LiPF_6$ and LiTDI (formula (II) with $R_f=CF_3$) (salts A) and KTDI (salt B of formula (IV) with $R_p=CF_3$);

mixture comprising $LiPF_6$ and LiTDI (formula (II) with $R_f=CF_3$) (salts A) and KFSI (salt B of formula (III) with $R_3=R_4=F$); and mixture comprising $LiPF_6$ and LiTDI (formula (II) with $R_f=CF_3$) (salts A) and $KPF_6$ (salt B).

9. The mixture as claimed claim 1, wherein the mixture is selected from one of the following mixtures:

mixture comprising lithium bis(fluorosulfonyl)imide (LiFSI) (salt A) and KFSI (salt B of formula (III) with $R_3=R_4=F$);

mixture comprising $LiPF_6$ (salt A) and $KPF_6$ (salt B).

10. The mixture as claimed in claim 1, wherein the mixture comprises lithium bis(fluorosulfonyl)imide (LiFSI) (salt A) and KFSI (salt B of formula (III) with $R_3=R_4=F$), the amount in KFSI ranging from 1 to 1000 ppm, relative to the total weight of the mixture.

11. A mixture comprising:

from 99% to 99.9999% by weight of at least one lithium salt A selected from the group consisting of $LiPF_6$; $LiBF_4$; $CH_3COOLi$; $CH_3SO_3Li$; $CF_3SO_3Li$; $CF_3COOLi$; $Li_2B_{12}F_{12}$; $LiBC_4O_8$; a salt of formula (I) below: $R_1$—$SO_2$—NLi—$SO_2$—$R_2$ (I) wherein $R_1$ and $R_2$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; a salt of formula (II) below:

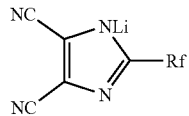

(II)

wherein $R_f$ represents $C_6F_{13}$, $C_7F_{15}$, $C_8F_{17}$, or $C_9F_{19}$; and mixtures thereof;

from 1 ppm to 10 000 ppm by weight of at least one potassium salt B selected from the group consisting of $KPF_6$; $KBF_4$; $CH_3COOK$; $CH_3SO_3K$; $CF_3SO_3K$; $CF_3COOK$; $K_2B_{12}F_{12}$; $KBC_4O_8$; a salt of formula (III) below: $R_3-SO_2-NK-SO_2-R_4$ (III) wherein $R_3$ and $R_4$ represent, independently of one another, F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; a salt of formula (IV) below:

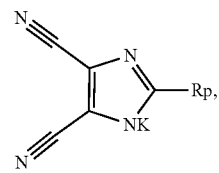

(IV)

wherein $R_p$ represents F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_6F_{13}$, $C_7F_{15}$, $C_8F_{17}$, or $C_9F_{19}$; and mixtures thereof.

\* \* \* \* \*